(12) United States Patent
Anzai et al.

(10) Patent No.: US 9,479,330 B2
(45) Date of Patent: Oct. 25, 2016

(54) METHOD, INFORMATION SERVICE SYSTEM AND PROGRAM FOR INFORMATION ENCRYPTION/DECRYPTION

(71) Applicant: Hitachi, Ltd., Tokyo (JP)

(72) Inventors: Kosuke Anzai, Tokyo (JP); Hisayoshi Sato, Tokyo (JP); Yoshiaki Isobe, Tokyo (JP); Suguru Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 14/304,255

(22) Filed: Jun. 13, 2014

(65) Prior Publication Data

US 2015/0082040 A1 Mar. 19, 2015

(30) Foreign Application Priority Data

Sep. 13, 2013 (JP) ................. 2013-189996

(51) Int. Cl.
*H04L 9/08* (2006.01)
(52) U.S. Cl.
CPC ........... *H04L 9/0822* (2013.01); *H04L 9/0861* (2013.01)
(58) Field of Classification Search
CPC ....... H04L 9/00; H04L 9/30; H04L 63/0464; H04L 63/0478; H04L 63/0281; H04L 20/06693
See application file for complete search history.

(56) References Cited

U.S. PATENT DOCUMENTS

| | | | |
|---|---|---|---|
| 8,094,810 B2 * | 1/2012 | Hohenberger | ........ H04L 9/3013 380/28 |
| 2006/0093150 A1 * | 5/2006 | Reddy | ................... H04L 9/0825 380/282 |

FOREIGN PATENT DOCUMENTS

WO WO 2012/147869 A1 11/2012

* cited by examiner

*Primary Examiner* — Benjamin Lanier
*Assistant Examiner* — Paul Callahan
(74) *Attorney, Agent, or Firm* — Foley & Lardner LLP

(57) ABSTRACT

With a portal server, a request for information from a terminal of a second user that is an agent for a first user is received, and an encrypted data directed to a terminal of the first user, stored in an encrypted-data memory unit, is re-encrypted using a re-encryption key for the second user, stored in a first encryption-key memory unit, and is transmitted to the terminal of the second user, with the terminal of the second user, the re-encrypted data received is decrypted using an encryption key for the second user, stored in a second encryption-key memory unit, and time keys specified by the terminal of the first user, related to a time-period during which browsing of the information is permitted.

9 Claims, 7 Drawing Sheets

METHOD, INFORMATION SERVICE SYSTEM AND PROGRAM FOR INFORMATION ENCRYPTION/DECRYPTION

The present application, claims priority from Japanese application JP-2013-189996 filed on Sep. 13, 2013, the content of which is hereby incorporated by reference into this application.

BACKGROUND OF THE INVENTION

The present invention relates to a system for encrypting information, and decrypting the encrypted information.

Along with the development of information systems, it is becoming common for servers of a plurality of information providers who perform information providing services and terminals of a plurality of users who utilize information to be connected to each other via the Internet or the like so that respective users utilize various information providing services. Also, as the number of information providers who perform information providing services increases, it is becoming difficult for respective users themselves to find and manage information providing services that they desire and, therefore, information relaying service providers that are referred to as "portal sites", who manage major and useful information providing services collectively and perform information relaying for users, are becoming necessary.

A presumed form of service is that an information provider transmits to an information relaying service provider data directed to a particular user, the information relaying service provider temporarily accumulates the transmitted data from the information provider directed to the user and the user acquires/browses based on his/her own request the information addressed to himself/herself that is temporarily accumulated by the information relaying service provider.

Also, in order to enhance user's convenience, a form of service, which is referred to as agent service, is also considered, with which a user grants another user agent authority and the user who is granted the agent authority can, on his/her behalf, acquire browse the data addressed and transmitted to the user who grants the agent authority.

When the service forms as described above are assumed and employed, a problem on security may be caused to occur. A role of the information relaying service provider is to temporarily store received data addressed to a user and to transmit based on a request from the user; the relaying service provider should not be able to browse the contents of the data. If the relaying service provider is able to browse the contents of the data, there exists a possibility that an information leakage unintended by the user is caused to occur by a fraudulent behavior of the information relaying service provider.

As a countermeasure against this information leakage, the use of such conventional technologies as the AES encryption makes it possible to conceal the data safely and efficiently; however, when encryption based on such conventional technologies is performed between the information provider and the user, new problems would be caused to occur with an assumption of the agent service.

Firstly, when a user passes his/her own encryption key to a different user to whom the user has granted agent authority, a problem arises that the different user becomes capable of decrypting all of the data other than the data for which agency has been intended.

Secondly, a method is also conceivable with which encrypted data which can be decrypted only by a different user who is granted agent authority is transmitted to the different user who is granted agent authority upon a separate request to the information provider. In this conceivable method, however, the information provider is additionally required to manage the agent and the encryption key corresponding to the agent, respectively, and to encrypt the data separately for the agent using the encryption key corresponding to the agent, thereby increasing the operation load imposed on the information provider.

As a conventional technology for solving the above-described problems, there has been known a method disclosed in WO 2012/147869, with which encrypted data is re-encrypted at the time of relaying information.

SUMMARY OF THE INVENTION

With the method disclosed in WO 2012/147869, however, to a different user to whom the user grants agent authority once, the agent browsing authority can be granted only for all the period including the past and the future. Also, although it is possible to grant agent authority only during a specific time-period by updating the encryption key and the re-encryption key for each time-period, the number of the encryption keys that the user, the agent, and the information provider should manage respectively, and the number of the re-encryption keys that the information relaying service provider should manage become enormous and a problem arises that the management and operation become complex.

It is an object of the present invention to provide a method, an information service system, and a program for information encryption decryption, which allow an agent of a user to browse user-dedicated information only during a certain time-period specified by the user while suppressing the number of the keys which should be managed.

One representative embodiment of the present invention is as follows. Namely the present invention provides a method of encrypting/decrypting information in an information service system where requested information is encrypted with an information providing server storing information in response to a request for information from any one of a plurality of user terminals, and it is transmitted to a user terminal of a source of information request via an information relay device. With the information relay device, a request for information from a terminal of a second user that is an agent for a first user is received, encrypted data of the information directed to a terminal of the first user is re-encrypted using a re-encryption key for the second user, where the encrypted data is stored in an encrypted-data memory unit and the re-encryption key is stored in a first encryption-key memory unit, and the re-encrypted data is transmitted to the terminal of the second user. Also, with the terminal of the second user, the re-encrypted data is received from the information relay device, and the re-encrypted data received is decrypted using an encryption key for the second user and time keys specified by the terminal of the first user, where the encryption key is stored in a second encryption-key memory unit and the time keys are related to a time-period during which browsing of the information is permitted.

Since the time keys allow an arbitrary user to specify to user's agent a time-period during which the user's agent is capable of browsing information directed to the user as the agent, the user's agent is capable of browsing the information directed to the user only during a certain time-period specified by the user while suppressing the number of the keys that should be managed.

Other objects, features, and advantages of the invention will become apparent from the following description of the embodiments of the invention taken in conjunction with the accompanying drawings.

DETAILED DESCRIPTION OF THE EMBODIMENT

Figure 1:
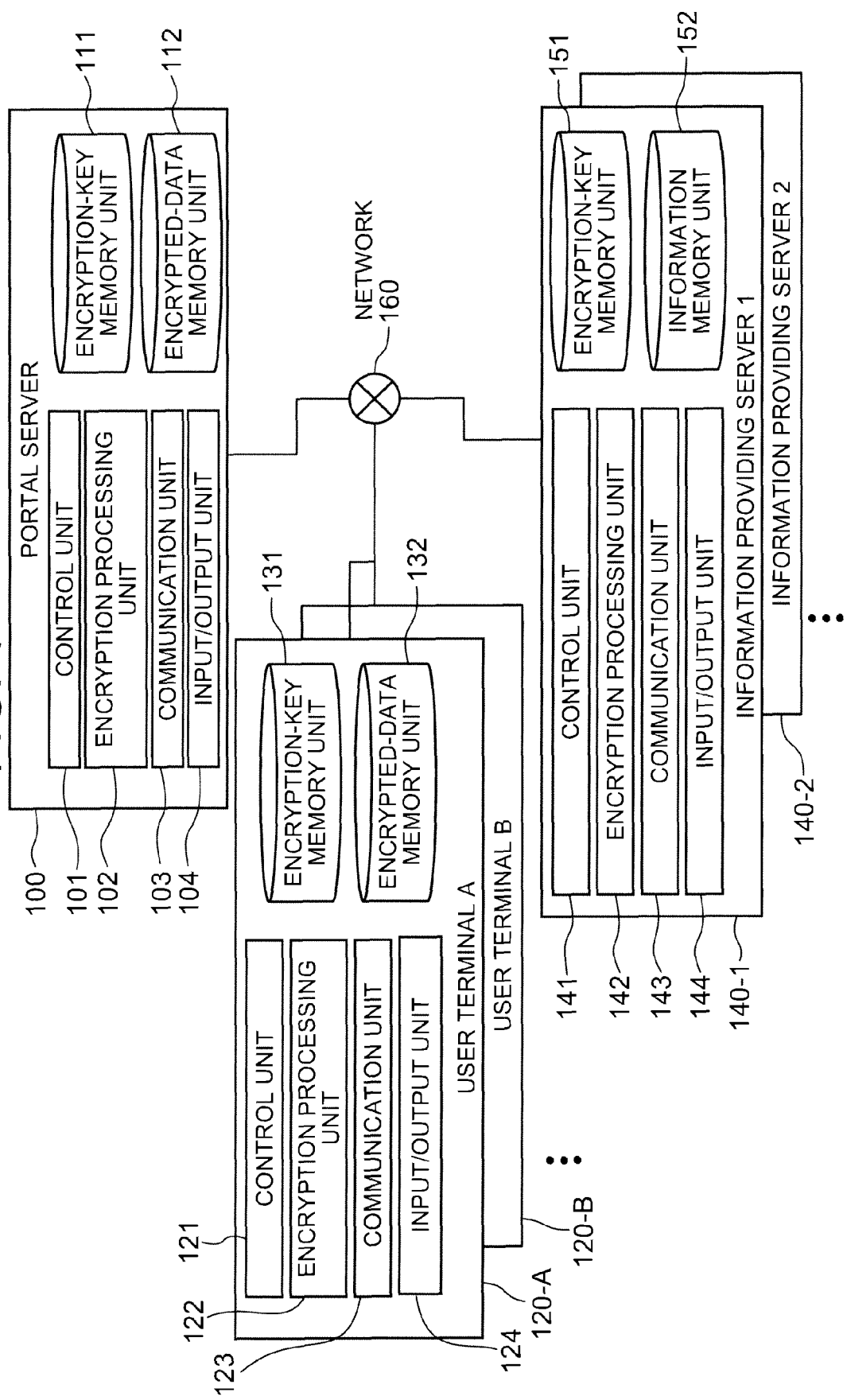
FIG. 1 is a diagram for exemplifying the schematic configuration of an information service system in a first embodiment.

Hereinafter, an explanation will be given for an embodiment of the present invention while referring to the drawings in FIGS. 1 to 7.

FIG. 1 is a schematic diagram of an information service system, which is the first embodiment of the present invention. As illustrated, the information service system includes one or more user terminals 120 which are used by users, one or more information providing servers 140 which are used by information providers, and a portal server (an information relaying device) 100 which is used by an information relaying service provider; the user terminals 120, the information providing servers 140, and the portal server 100 are so designed as to be able to transmit/receive information to each other via a network 160. An information service system having a configuration like this is a system in which data encrypted by an information providing server 140 for a particular user terminal 120 is re-encrypted for the user terminal 120 for an agent designated by the user upon request from the user terminal 120 without being decrypted by the portal server 100 in the model where the portal server 100 which relays information exists between the plurality of information providing servers 140 and the plurality of user terminals 120 which acquire information.

Incidentally, with regard to the user terminals 120, it is assumed that a plurality of user terminals 120 such as a user terminal A (120-A), a user terminal B (120-B), and so on are connected because a plurality of users use respective user terminals.

Also, with regard to the information providing servers 140, it is assumed that a plurality of information providing servers such as an information providing server 1 (140-1), an information providing server 2 (140-2), and so on are connected, supposing that a plurality of information providers use respective information providing servers.

Next, an explanation will be given on outlines of functions of respective devices that constitute the system in FIG. 1.

Each of the information providing servers 140 includes a control unit 141, an encryption processing unit 142, a communication unit 143, an input/output unit 144, an encryption-key memory unit 151, and an information memory unit 152.

Data that are to be transmitted to user terminals 120 via the portal server 100 are stored in the information memory unit 152, and an encryption key for encrypting data to be transmitted is stored in the encryption-key memory unit 151.

The encryption processing unit 142 is equipped with functions regarding general encryption processings such as generation of the encryption key for encrypting data to be transmitted to user terminals 120 and generation of encrypted data by encrypting data stored in the information memory unit 152 with an encryption key stored in the encryption-key memory unit 151.

The communication unit 143 is equipped with functions regarding processings of transmitting/receiving information (such as encryption keys and encrypted data) via the network 160 to/from the user terminals 120 and the portal server 100.

The input/output unit 144 is equipped with functions such as receiving inputs from the information providers and displaying information to the information providers.

The control unit 141 is equipped with functions of controlling overall processings of the respective units included in each of the information providing servers 140. For example, overall processings are controlled such as reading out data to be encrypted from the information memory unit 152, reading out a specified encryption, key from the encryption-key memory unit 151, inputting the data to be encrypted and the encryption key into the encryption processing unit 142, generating encrypted data by performing encryption processings with the encryption processing unit 142, and transmitting the generated encrypted data to the portal server 100 via the network 160 with the communication unit 143.

The portal server 100 includes a control unit 101, an encryption processing unit 102, a communication unit 103, an input/output unit 104, an encryption-key memory unit 111, and an encrypted-data memory unit 112.

Encrypted data received from the information providing server 140 and data re-encrypted in the portal server 100 are stored in the encrypted-data memory unit 112, and an encryption key for re-encrypting in the portal server 100 and the like are stored in the encryption-key memory unit 111.

The encryption processing unit 102 is equipped with functions regarding general encryption processings such as generation of encryption keys to be transmitted to the user terminals 120 and generation of encrypted data by re-encrypting the data stored in the encrypted-data memory unit 112 with a re-encryption key stored in the encryption-key memory unit 111.

The communication unit 103 is equipped with functions regarding processings of transmitting/receiving information (such as encryption keys and encrypted data) via the network 160 to/from the user terminals 120 and the information providing servers 140.

The input/output unit 104 is equipped with functions such as receiving inputs from the information relaying service provider and displaying information to the information relaying service provider.

The control unit 101 is equipped with functions of controlling overall processings of the respective units included in the portal server 100. For example, overall processings are controlled such as reading out encrypted data from the encrypted-data memory unit 112, reading out a specified re-encryption key from the encryption-key memory unit 111, inputting the encrypted data and the re-encryption key into the encryption processing unit 102, generating encrypted data by performing re-encryption processings with the encryption processing unit 102, and storing the re-encrypted data in the encrypted-data memory unit 112.

Each of the user terminals 120 includes a control unit 121, an encryption processing unit 122, a communication unit 123, an input/output unit 124, an encryption-key memory unit 131, and an encrypted-data memory unit 132.

The encrypted data received from the portal server 100 and the like are stored in the encrypted-data memory unit 132, and an encryption key for decrypting the encrypted data in the user terminal 120 and the like are stored in the encryption-key memory unit 131.

The encryption processing unit 122 is equipped with functions regarding general encryption processings such as generation of the encryption key for decrypting the encrypted data in the user terminal 120, and decryption of the encrypted data stored in the encrypted-data memory unit 132 with the encryption key stored in the encryption-key memory unit 131.

The communication unit 123 is equipped with functions regarding processings of transmitting/receiving information (such as encryption keys and encrypted data) via the network 160 to/from the portal server 100 and the information providing servers 140.

The input/output unit 124 is equipped with functions such as receiving inputs from the users and displaying information to the users.

The control unit 121 is equipped with functions of controlling overall processings of the respective units included in each of the user terminals 120. For example, overall processings are controlled such as reading out encrypted data from the encrypted-data memory unit 132, reading out a specified encryption key from the encryption-key memory unit 131, inputting the encrypted data and the encryption key into the encryption processing unit 122 and decrypting the encrypted data by performing decryption processings with the encryption processing unit 122.

Figure 2:
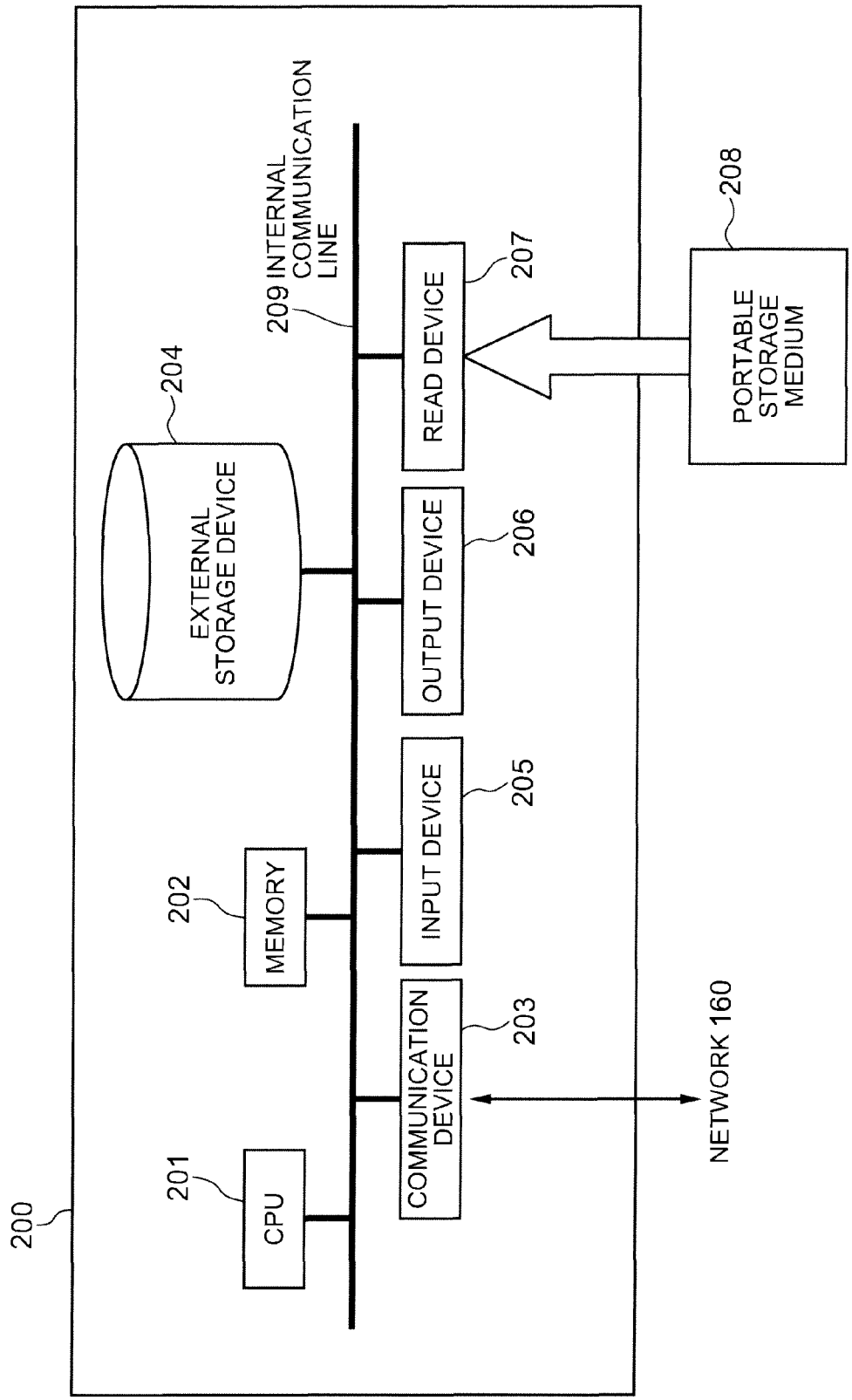
FIG. 2 is a diagram for exemplifying the schematic configuration of an electronic computing device.

Incidentally, the respective devices of the user terminals 120, the portal server 100, and the information, providing servers 140, which are exemplified in FIG. 1, can be implemented with a general electronic computing device (a computer) 200 as illustrated in FIG. 2, for example, which includes a CPU 201, a memory 202, an external storage device 204 such as a hard disc drive, a communication device 203 for performing communication with other devices via the Internet or the network 160, an input device 205 such as a keyboard or a mouse, an output device 206 such as a display device or a printer, a read device 207 to read out information from a portable storage medium 208, and an internal communication line 209 for establishing connections among these respective devices.

As for the respective devices constituting each of the user terminals 120, for example, the encryption-key memory unit 131 and the encrypted-data memory unit 132 can be implemented in such a manner that the CPU 201 utilizes the memory 202 or the external storage device 204, the control unit 121 and the encryption processing unit 122 can be implemented in such a manner that a prescribed program stored in the external storage device 204 is loaded onto the memory 202 and executed by the CPU 201, the input/output unit 124 can be implemented in such a manner that the CPU 201 utilizes the input device 205 and the output device 206, and the communication unit 123 can be implemented in such a manner that the CPU 201 utilizes the communication device 203.

This prescribed program may be stored (downloaded) into the external storage device 204 from the storage medium 208 via the read device 207 or from the network 160 via the communication device 203 and, then, loaded onto the memory 202 so that it is executed by the CPU 201. Alternatively, it may be directly loaded onto the memory 202 from the storage medium 208 via the read device 207 or from the network 160 via the communication device 203 so that it is executed by the CPU 201.

Hereinafter, the explanation will be given with regard to a cryptographic scheme implemented in the encryption processing unit 122 of each of the user terminals 120, the encryption processing unit 102 of the portal server 100, and the encryption processing unit 142 of each of the information providing servers 140.

Here, an encrypted data obtained with an encryption operation f of the above-described cryptographic scheme on information M to be encrypted with an encryption key K is denoted as f(K, M) and a new encryption key generated by performing a certain operation to an encryption key $K_1$ and an encryption key $K_2$ is referred to as $K_1 \cdot K_2$. Besides, the encrypted data f(K, M) can be decrypted back to the information M using the encryption key K (or its inverse).

The first property of the above-described cryptographic scheme is that an encryption-key transformation operation U on a data $f(K_2, M)$, which is obtained by encrypting information M with an encryption key $K_2$, using a re-encryption key $K_1$ can cause transformation into a data $f(K_1 \cdot K_2, M)$, which is equivalent to encryption with the encryption key $K_1 \cdot K_2$. Namely, $$U(K_1, f(K_2, M)) = f(K_1 \cdot K_2, M) \quad \text{(Expression 1)}$$

Utilizing the above-described first property, letting a re-encryption key generated with the certain operation "·" from the encryption key $K_2$ and an encryption key $K_1^{-1}$, which can be generated from the encryption key $K_1$ as its inverse, the following relationship holds:

$$U(K_2 \cdot K_1^{-1}, f(K_1, M)) = f(K_2 \cdot K_1^{-1} \cdot K_1, M) = f(K_2, M). \quad \text{(Expression 1-1)}$$

Namely, using the re-encryption key $K_2 \cdot K_1$, the encrypted data $f(K_1, M)$ encrypted with the encryption key $K_1$ can be transformed into the encrypted data $f(K_2, M)$ encrypted with the encryption key $K_2$ without being decrypted.

The second property of the above-described cryptographic scheme is that $f(K_1, f(K_2, M))$ generated by re-encrypting $f(K_2, M)$, which is an encrypted data of information M with an encryption key $K_2$, with an encryption key $K_1$, is equal to $f(K_2, f(K_1, M))$ generated by re-encrypting $f(K_1, M)$, which is an encrypted data of the information M with the encryption key $K_1$, with the encryption key $K_2$; that is, the sequence of the encryptions possesses the commutative property:

$$f(K_1, f(K_2, M)) = f(K_2, f(K_1, M)). \quad \text{(Expression 2)}$$

The third property of the above-described cryptographic scheme is that the certain operation "·" between the encryption keys possesses the following commutative property:

$$K_1 \cdot K_2 = K_2 \cdot K_1 \quad \text{(Expression 3)}$$

Next, the explanation will be given regarding time keys T and S that possess a one-way property. In addition that the time keys possess the properties as encryption keys of the above-described cryptographic scheme, they are generated under the following constraint conditions.

An (i+1)-th time key $T_{i+1}$ is generated as a result of applying the hash function H to an i-th time key $T_i$. Namely, they satisfy the relationship of $T_{i+1}=H(T_i)$. Thus, when only $T_p$ is known, this relationship allows generation of $T_{p+1}$, $T_{p+2}$, and so on, whose subscripts are larger than p, by using the hash function sequentially, but the one-way property of the hash function prevents generation of $T_{p-1}$, $T_{p-2}$, and so on, whose subscripts are smaller than p.

An (i-1)-th time key $S_{i-1}$ is generated as a result of applying the hash function H to an i-th time key $S_i$. Namely, they satisfy the relationship of $S_{i-1}=H(S_i)$. Thus, when only $S_q$ is known, this relationship allows generation of $S_{q-1}$, $S_{q-2}$, and so on, whose subscripts are smaller than q, by using the hash function sequentially, but the one-way property of the hash function prevents generation of $S_{q+1}$, $S_{q+2}$, and so on, whose subscripts are larger than q.

Figure 3:
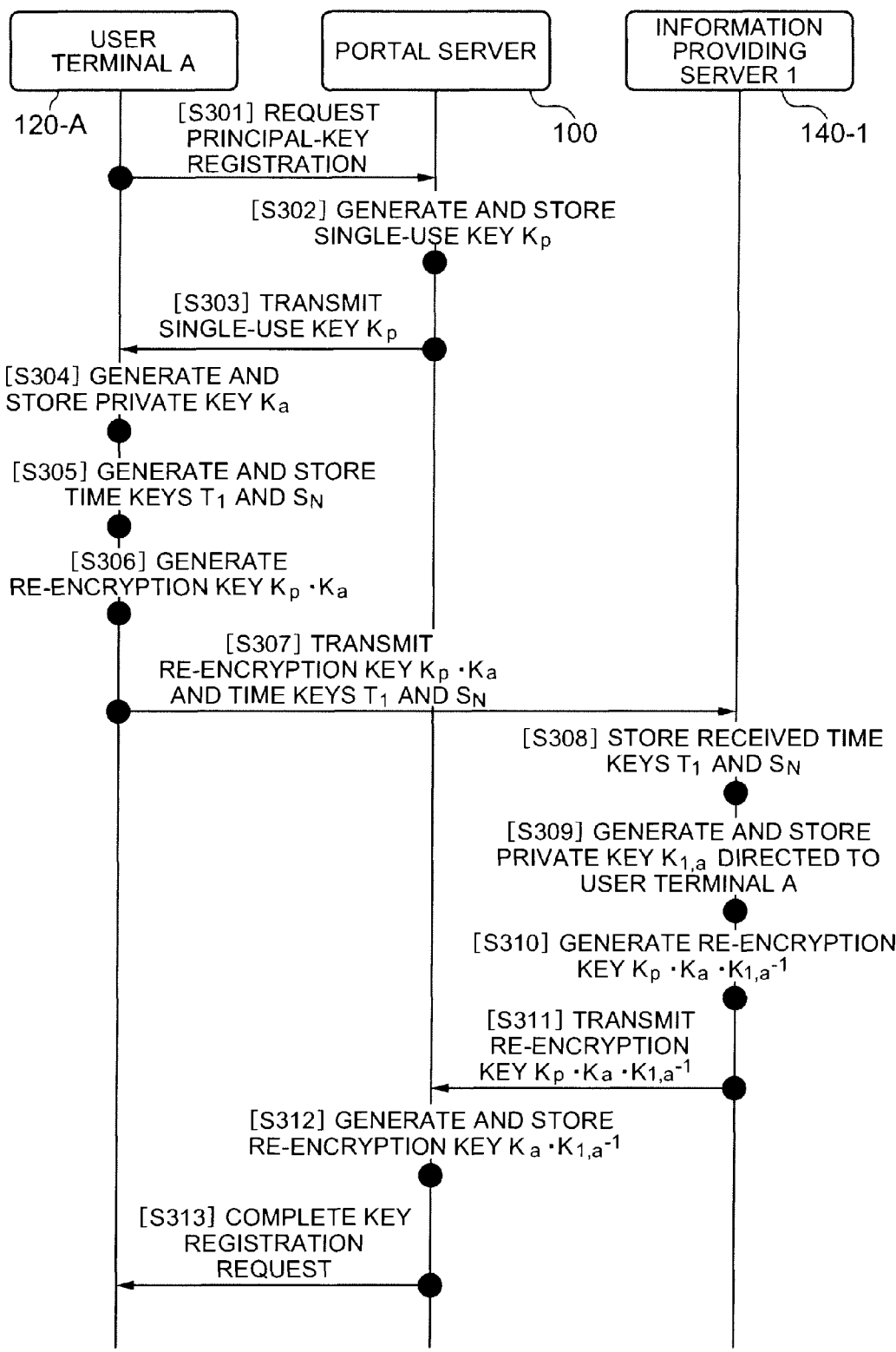
FIG. 3 is a sequence diagram for exemplifying processings of performing a principal-key registration request in the first embodiment.

FIG. 3 is a diagram for illustrating the sequence in which a user terminal 120 registers a re-encryption key for a principal into the portal server 100 in cooperation with an information providing server 140 in the present embodiment.

First, the user terminal A (120-A) transmits a registration, request of the re-encryption key for the principal to the portal server 100 with the communication unit 123 (S301); the portal, server 100 generates a single-use key $K_p$ in the encryption processing unit 102, stores it in the encryption-key memory unit 111 (S302), and transmits the single-use key $K_p$ to the user terminal A (120-A) with the communication unit 103 (S303).

Next, the user terminal A (120-A) generates a private key $K_a$ as an encryption key for itself in the encryption, processing unit 122 and stores it in the encryption-key memory unit 131 (S304), generates a time key $T_1$ and a time key $S_N$ (where N is an arbitrary positive integer) as encryption keys for time specification in the encryption processing unit 122, store them in the encryption-key memory unit 131 (S305), and generates a re-encryption key $K_p \cdot K_a$, which serves as a basis of a re-encryption key for the principal, in the encryption processing unit 122 (S306).

Next, the user terminal A (120-A) transmits to the information providing server 1 (140-1) the re-encryption key $K_p \cdot K_a$ generated at S306 and the time keys $T_1$ and $S_N$ generated at S305 with the communication unit 123 (S307). Here, the re-encryption key $K_p \cdot K_a$ generated at S306 and the time keys $T_1$ and $S_N$ generated at S305 are the data that must not be known to anybody other than the user terminal A (120-A) or the information providing server 1 (140-1); they need to be concealed from the other user terminals, the other information providing servers, and the portal server by using cryptographic communication such as the SSL.

Next, the information providing server 1 (140-1) stores in the encryption-key memory unit 151 the time keys $T_1$ and $S_N$ which are received with the communication unit 143 (S308), generates a private key $K_{1,a}$ directed to the user terminal A (120-A) in the encryption processing unit 142, stores it in the encryption-key memory unit 151 (S309), generates a re-encryption key $K_p \cdot K_a \cdot K_{1,a}^{-1}$, which serves as a basis of a re-encryption key directed to the user terminal A (120-A), in the encryption processing unit 142 (S310), and transmits the re-encryption key $K_p \cdot K_a \cdot K_{1,a}^{-1}$ generated at S310 to the portal server 100 with the communication unit 143 (S311).

Next, the portal server 100 generates a re-encryption key $K_a \cdot K_{1,a}^{-1}$ ($=K_p^{-1} \cdot K_p \cdot K_a \cdot K_{1,a}^{-1}$) in the encryption processing unit 102 using the re-encryption key $K_p \cdot K_a \cdot K_{1,a}^{-1}$ received in the communication unit 103 and the inverse $K_p^{-1}$ of the encryption key $K_p$ stored in the encryption-key memory unit 111 and stores in the encryption-key memory unit 111 (S312). Here, the encryption key $K_p$ stored in the encryption-key memory unit 111 may be discarded because it is the single-use key for generating the re-encryption key.

Finally, the portal server 100 transmits a notification of completion of the request for registration of the key to the user terminal A (120-A) with the communication unit 103, and the communication unit 123 of the user terminal A (120-A) receives this notification, thereby terminating the processings (S313).

Figure 4:
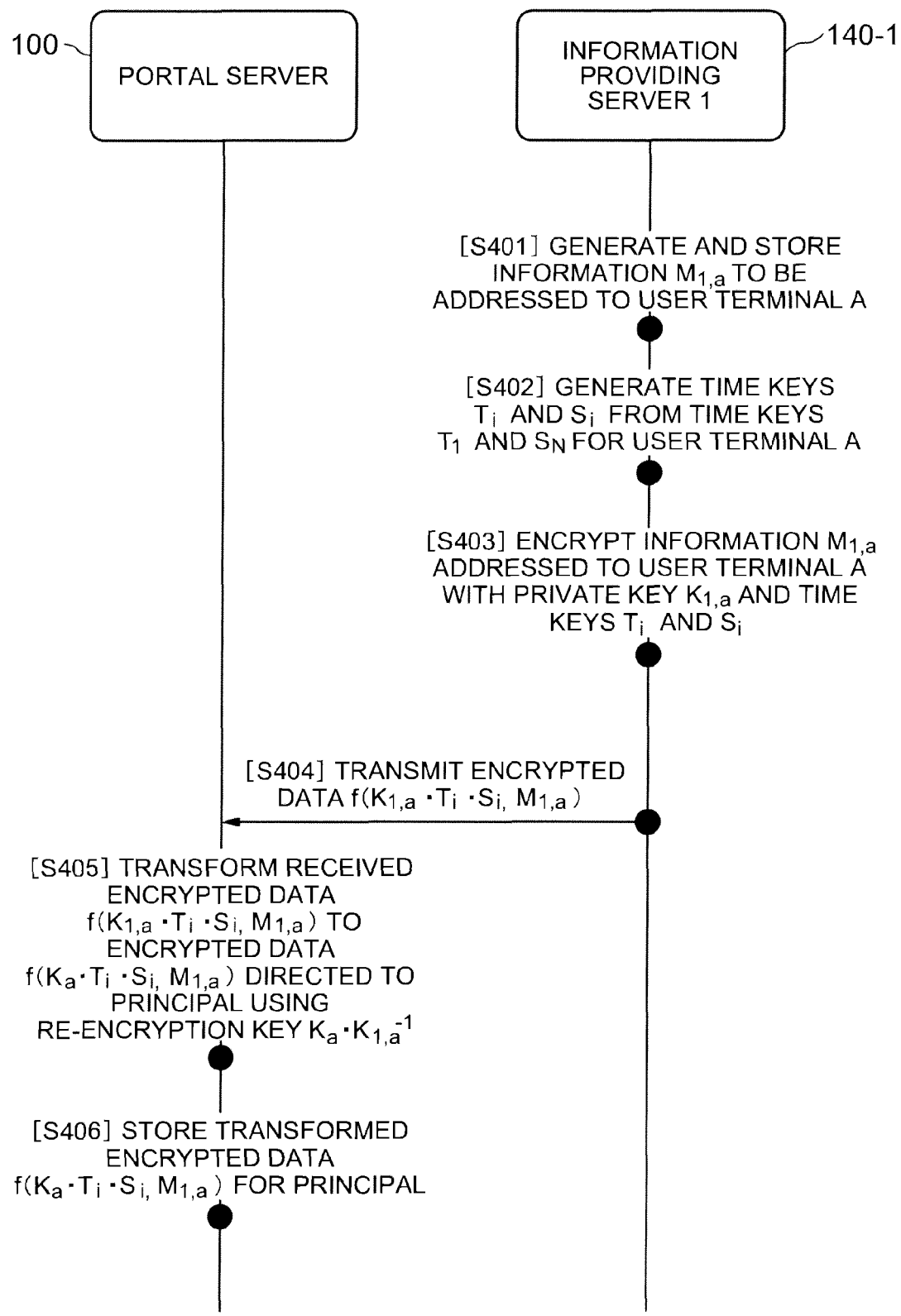
FIG. 4 is a sequence diagram for exemplifying processings of transmitting encrypted data addressed to a principal in the first embodiment.

FIG. 4 is a diagram for illustrating the sequence in which the information providing server 140 encrypts information directed to a particular user terminal 120 and transmits to the portal server 100 in the present embodiment.

First, the information providing server 1 (140-1) generates information $M_{1,a}$ that is to be addressed and transmitted to the user terminal A (120-A), stores it in the information memory unit 152 (S401), and generates a time key $T_i$ and a time key $S_i$ corresponding to the current time of transmission of the information using the time keys $T_1$ and $S_N$ for the user-terminal-A (120-A), which are stored in the encryption-key memory unit 151 (S402).

Next, the information providing server 1 (140-1) generates in the encryption processing unit 142 an encrypted data $f(K_{1,a} \cdot T_i \cdot S_i, M_{1,a})$ by encrypting the information $M_{1,a}$ addressed and transmitted to the user terminal A (120-A), which is stored in the information memory unit 152 with an encryption key $K_{1,a} \cdot T_i \cdot S_i$ generated using the private key $K_{1,a}$ for the user terminal A (120-A), which is stored in the encryption-key memory unit 151, and the time keys $T_i$ and $S_i$ generated at S402 (S403).

Next, the information providing server 1 (140-1) transmits the generated encrypted data $f(K_{1,a} \cdot T_i \cdot S_i, M_{1,a})$ to the portal server 100 with the communication unit 143 (S404).

Next, the portal server 100 generates in the encryption processing unit 102 encrypted data $f(K_{1,a} \cdot T_i \cdot S_i, M_{1,a})$ by re-encrypting the encrypted data $f(K_{1,a} \cdot T_i \cdot S_i, M_{1,a})$ received with the communication unit 103 with the re-encryption key $K_a \cdot K_{1,a}^{-1}$ for the user terminal A (120-A), which is stored in the encryption-key memory unit 111 (S405). Here, the generation process of the encrypted data $f(K_{1,a} \cdot T_i \cdot S_i, M_{1,a})$ is shown, as follows:

$$U(K_a \cdot K_{1,a}^{-1}, f(K_{1,a} \cdot T_i \cdot S_i, M_{1,a}))=f(K_a \cdot K_{1,a}^{-1} \cdot K_{1,a} \cdot T_i \cdot S_i, M_{1,a})=f(K_a \cdot T_i \cdot S_i, M_{1,a})$$

Finally, the portal server 100 stores in the encrypted-data memory unit 112 the encrypted data $f(K_{1,a} \cdot T_i \cdot S_i, M_{1,a})$ generated at S405, thereby terminating the processings (S406).

Figure 5:
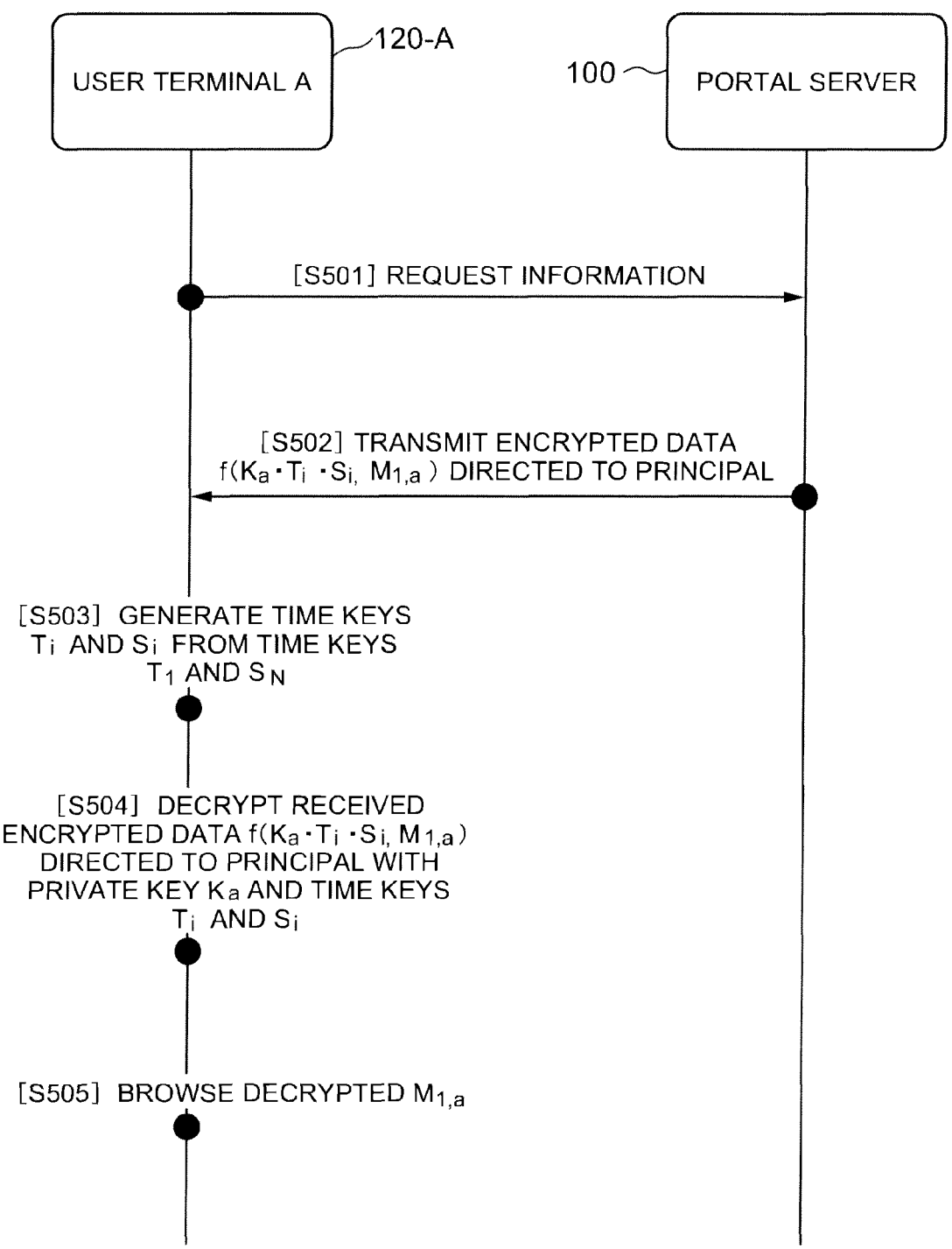
FIG. 5 is a sequence diagram for exemplifying processings of acquiring and browsing encrypted data addressed to a principal in the first embodiment.

FIG. 5 is a diagram for illustrating the sequence in which the user terminal A (120-A) acquires the encrypted data directed to the principal from the portal server 100, decrypts, and browses the decrypted information in the present embodiment.

First, the user terminal A (120-A) transmits a request for information directed to the principal to the portal server 100 with the communication unit 123 (S501); the portal server 100 reads out the encrypted data $f(K_{1,a} \cdot T_i \cdot S_i, M_{1,a})$ stored in the encrypted-data memory unit 112 and transmits to the user terminal A (120-A) the read-out encrypted data $f(K_{1,a} \cdot T_i \cdot S_i, M_{1,a})$ with the communication unit 103 (S502).

Next, the user terminal A (120-A) generates in the encryption processing unit 122 the time key $T_i$ and the time key $S_i$ using the time keys $T_1$ and $S_N$ that are read out from the encryption-key memory unit 131 (S503).

Next, the user terminal A (120-A) generates in the encryption processing unit 122 the information $M_{1,a}$ by decrypting the encrypted data $f(K_{1,a} \cdot T_i \cdot S_i, M_{1,a})$ received at S502 with the inverse of the encryption key $K_a \cdot T_i \cdot S_i$, which is generated using the private key Ka for the user (i.e., the principal), which is stored in the encryption-key memory unit 151, and the time keys $T_i$ and $S_i$ generated at S503 (S504).

Finally, the user browses the information $M_{1,a}$ decrypted at S504, thereby terminating the processings (S505).

Figure 6:
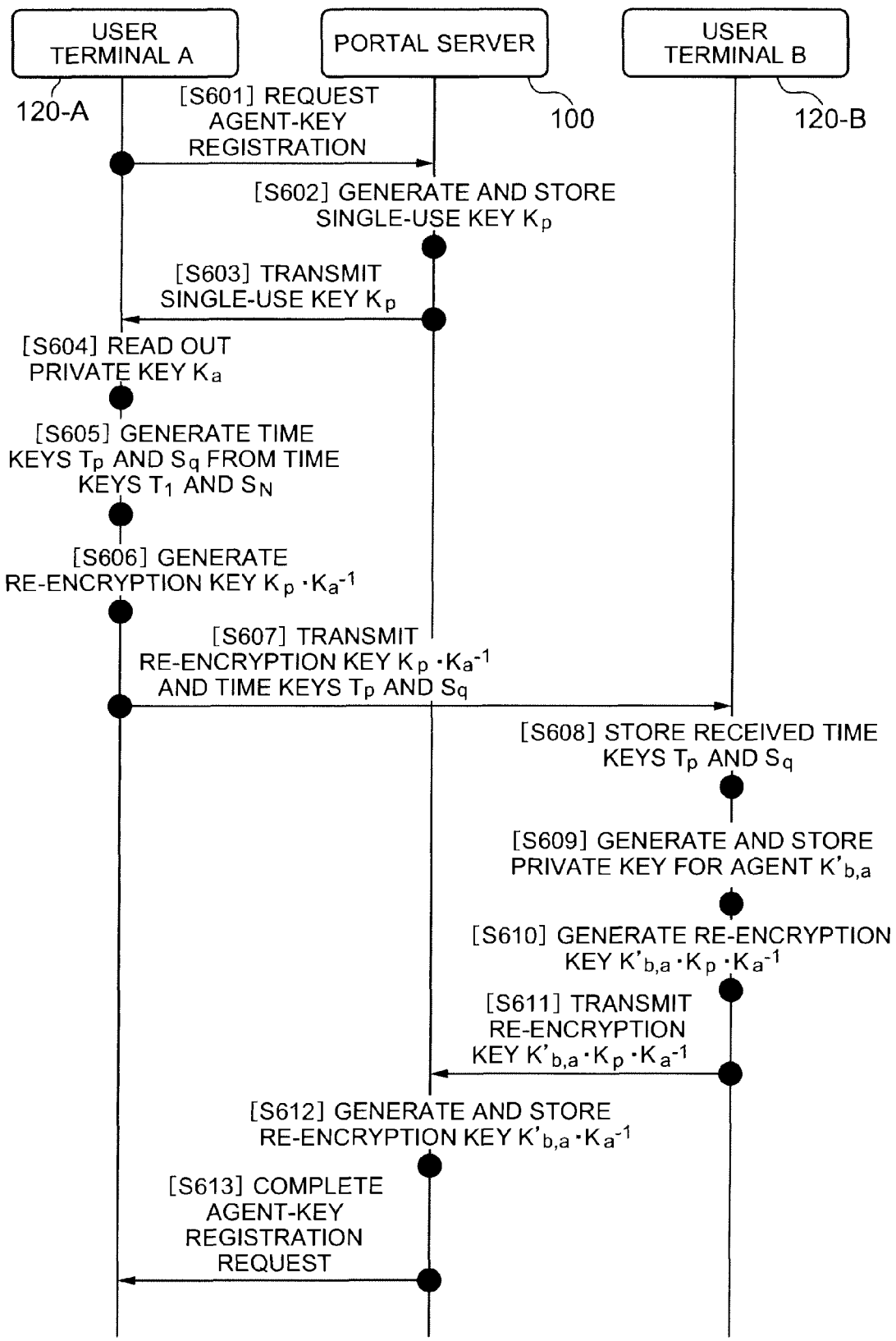
FIG. 6 is a sequence diagram for exemplifying processings of performing an agent-key registration request in the first embodiment.

FIG. 6 is a diagram for illustrating the sequence in which a plurality of user terminals 120 register in the portal server 100 re-encryption keys for agents in the present embodiment.

First, the user terminal A (120-A) transmits a registration request of the re-encryption key for an agent to the portal server 100 with the communication unit 123 (S601), the portal server 100 generates a single-use key $K_p$ in the encryption processing unit 102, stores it in the encryption-key memory unit 111 (S602), and transmits the single-use key $K_p$ to the user terminal A(120-A) with the communication unit 103 (S603).

Next, the user terminal A (120-A) reads out the private key for itself $K_a$ stored in the encryption-key memory unit 131 (S604), generates in the encryption processing unit 122 a time key $T_p$ related to a start point of the time-period during which browsing is permitted and a time key $S_q$ related to an end point of the time-period during which browsing is permitted from the time keys $T_1$ and $S_N$ for time specification which are stored in the encryption-key memory unit 131 (S605), and generates a re-encryption key $K_p \cdot K_a^{-1}$, which serves as a basis of a re-encryption key for the agent, in the encryption processing unit 122 (S606). Here, p and q of the time keys are caused to satisfy the relationship of $1 \leq p \leq q \leq N$.

Next, the user terminal A (120-A) transmits to the user Terminal B (120-B) that is specified as the agent, the re-encryption key $K_p \cdot K_a^{-1}$ generated at S606 and the time keys $T_p$ and $S_q$ generated at S605 with the communication unit 123 (S607). Here, the re-encryption key $K_p \cdot K_a^{-1}$ generated at S606 and the time keys $T_p$ and $S_q$ generated at S605 are the data that must not be known to anybody other than the user terminal A (120-A) or the user terminal B (120-B); they need to be concealed from the other user terminals, the other information providing servers, and the portal server by using cryptographic communication such as the SSL.

Next, the user terminal B (120-B) stores in the encryption-key memory unit 131 the time keys $T_p$ and $S_q$ which are received with the communication unit 123 (S608), generates a private key for an agent $K'_{b,a}$ directed to the user terminal A (120-A) in the encryption processing unit 122, stores it in the encryption-key memory unit 131 (S609), generates a re-encryption key $K'_{b,a} \cdot K_p \cdot K_a^{-1}$, which serves as a basis of a re-encryption key for an agent directed to the user terminal A (120-A), in the encryption processing unit 122 (8610), transmits the re-encryption key $K'_{b,a} \cdot K_p \cdot K_a^{-1}$ generated at S610 to the portal server 100 with the communication unit 123 (S611).

Next, the portal server 100 generates a re-encryption key for an agent $K'_{b,a} \cdot K_a^{-1}$ $(= K'_{b,a} \cdot (K_p^{-1} \cdot K_p) \cdot K_a^{-1} = K_p^{-1} \cdot K'_{b,a} \cdot K_p \cdot K_a^{-1})$ in the encryption processing unit 102 using the re-encryption $K'_{b,a} \cdot K_p \cdot K_a^{-1}$ received with the communication unit 103 and the inverse $K_p^{-1}$ of the encryption key $K_p$ stored in the encryption-key memory unit 111 and stores in the encryption-key memory unit 111 (S612). Here, the encryption key $K_p$ stored into the encryption-key memory unit 111 may be discarded because it is the single-use key for generating the re-encryption key.

Finally, the portal server 100 transmits a notification of completion of the request for registration of the re-encryption key for an agent to the user terminal A (120-A) with the communication unit 103, and the communication unit 123 of the user terminal A (120-A) receives this notification, thereby terminating the processings (S613).

Incidentally, instead of the time key $S_q$ transmitted to the user terminal B (120-B), generating a time key $S_{q+j}$ ($q \leq q+j \leq N$) and retransmitting to the user terminal B (120-B) allows to extend the time-period during which the agent is capable of browsing.

Figure 7:
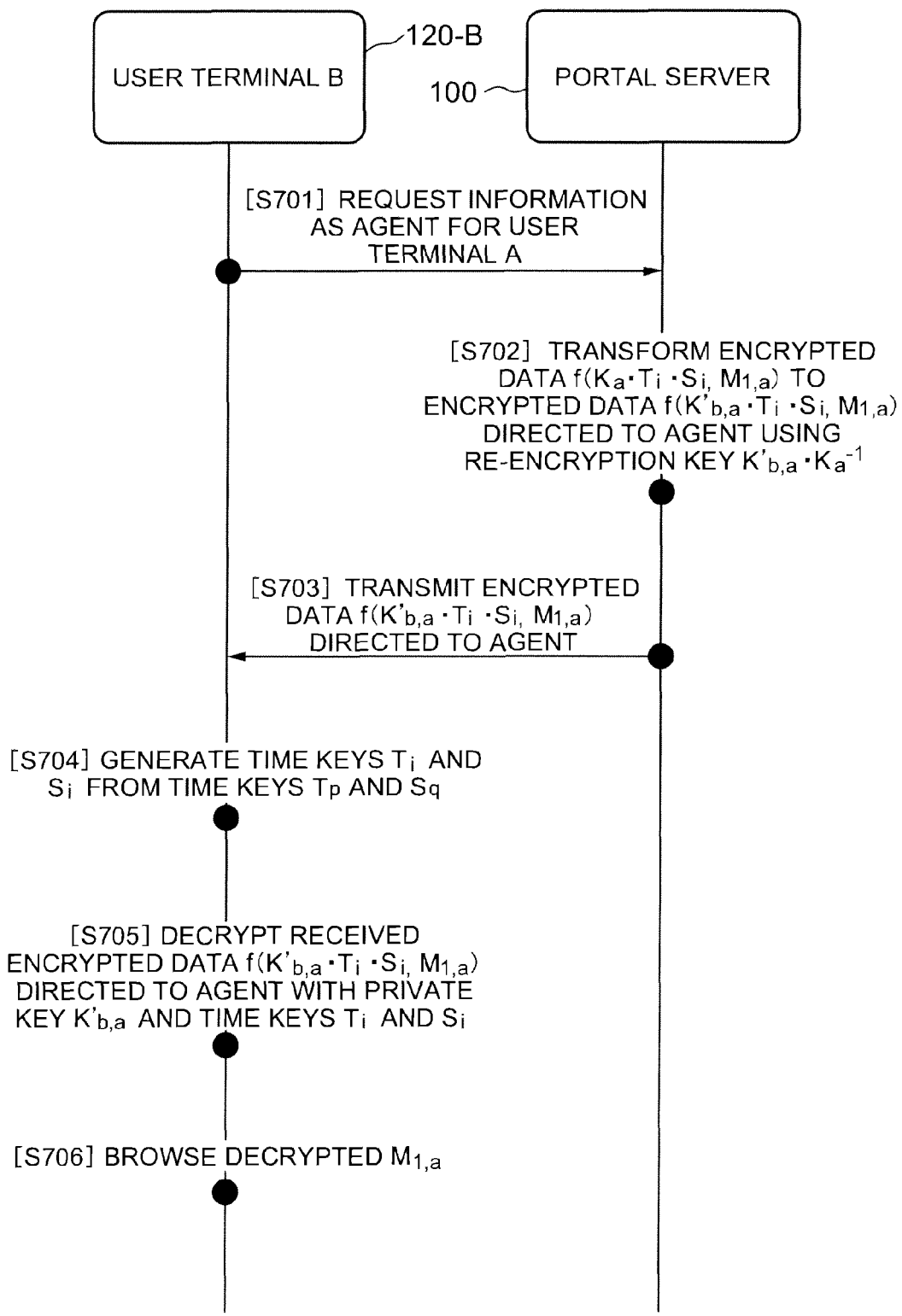
FIG. 7 is a sequence diagram for exemplifying processings with which an agent acquires and browses encrypted data addressed to a source of agency in the first embodiment.

FIG. 7 is a diagram for illustrating the sequence in which the user terminal 120 of the agent acquires the encrypted data directed to the agent from the portal server 100, decrypts, and browses the decrypted information in the present embodiment.

First, the user terminal B (120-B) as an agent transmits a request for information as an agent for the user terminal A (120-A) to the portal server 100 with the communication unit 123 (S701).

Next, the portal server 100 generates in the encryption processing unit 102 an encrypted data $f(K'_{b,a} \cdot T_i \cdot S_i, M_{1,a})$ directed to the agent by re-encrypting the encrypted data $f(K'_{b,a} \cdot T_i \cdot S_i, M_{1,a})$ stored in the encrypted-data memory unit 112 using the re-encryption key $K'_{b,a} \cdot K_a^{-1}$ for an agent of the user terminal B (120-B) stored in the encryption-key memory unit 111 (S702). Here, the generation process of the encrypted data $f(K'_{b,a} \cdot T_i \cdot S_i, M_{1,a})$ is shown as follows:

$$U(K'_{b,a} \cdot K_a^{-1}, f(K_a \cdot T_i \cdot S_i, M_{1,a})) = f(K'_{b,a} \cdot K_a^{-1} \cdot K_a \cdot T_i \cdot S_i, M_{1,a}) = f(K'_{b,a} \cdot T_i \cdot S_i, M_{1,a})$$

Next, the portal server 100 transmits to the user terminal B (120-B) the encrypted data $f(K'_{b,a} \cdot T_i \cdot S_i, M_{1,a})$ directed to the agent generated at S702 with the communication unit 103 (S703).

Next, the user terminal B (120-B) generates in the encryption processing unit 122 a time key $T_i$ and a time key $S_i$ using the time keys $T_p$ and $S_q$ that are read out from the encryption-key memory unit 131 (S704). Here, when p and q of the time keys specified from the user terminal A (120-A) and i satisfy $p \leq i \leq q$, both the time key $T_i$ and the time key $S_i$ can be generated; however, it is impossible to generate the time key $T_i$ in the case of i<p and it is impossible to generate the time key $S_i$ in the case of q<i. Accordingly, when p and q of the time keys specified from the user terminal A (120-A) do not satisfy the condition of $p \leq i \leq q$, the subsequent sequence cannot be executed and, consequently, the user terminal B (120-B) cannot decrypt and browse the encrypted data $f(K'_{b,a} \cdot T_i \cdot S_i, M_{1,a})$ directed to the agent.

Next, the user terminal B (120-B) generates in the encryption processing unit 122 the information $M_{1,a}$ by decrypting the encrypted data $f(K'_{b,a} \cdot T_i \cdot S_i, M_{1,a})$ received at S703 with the inverse of $K'_{b,a} \cdot T_i \cdot S_i$, which is generated using the private key $K'_{b,a}$ for an agent, which is stored in the encryption-key memory unit 131, and the time keys $T_i$ and $S_i$ generated at S704 (S705).

Finally, by rendering the information $M_{1,a}$ outputted to the output device 206, the user B as an agent browses the information $M_{1,a}$ decrypted at S705, thereby terminating the processings (S706).

As an example of the methods for utilizing the time keys T and S, the explanation will be given below regarding a method of carrying out a control over browsing permission in months.

First of all, at S305, which is carried out in the user terminal A (120-A), the time keys $T_1$ and $S_{12}$ are generated and stored. Then, it becomes possible to generate $T_2$ to $T_{12}$ and $S_1$ to $S_{11}$ by sequentially applying a hash function H to the generated time keys $T_1$ and $S_{12}$; these time keys are associated with respective months of a certain year (e.g., $T_1$ and $S_1$ with January 2013, $T_2$ and $S_2$ with February 2013, and so on up to $T_{12}$ and $S_{12}$ with December 2013, respectively) for control.

Next, at S402, which is carried out in the information providing server 1 (140-1), the time key $T_i$ and the time key $S_i$ corresponding to the current date of transmission of information (e.g., the time key $T_4$ and the time key $S_4$ if the current date is April 2013) are generated, and, at S403, the encrypted data $f(K_{1,a} \cdot T_4 \cdot S_4, M_{1,a})$ is generated using the generated time keys.

Next, at S605, which is carried out in the user terminal A (120-A), the time keys corresponding to a time-period during which browsing is permitted to an agent (e.g., the time key $T_3$ and the time key $S_5$ when browsing is permitted from March to May) are generated using the time key $T_1$ and the time key $S_{12}$ for time specification.

Finally, at S704, which is carried out in the user terminal B (120-B), since the time key $T_3$ and the time key $S_5$ generated at S605, which correspond to the time-period of permitted browsing (March to May in 2013) according to the present embodiment are stored, the time key $T_4$ and the time key $S_4$ can be generated using these time keys and decrypt and browse the encrypted data directed to an agent $f(K'_{b,a} \cdot T_4 \cdot S_4, M_{1,a})$ corresponding to the current date of transmission of information (April 2013) can be decrypted and browsed. However, the encrypted data directed to an agent $f(K'_{b,a} \cdot T_8 \cdot S_8, M_{1,a})$ corresponding to a date other than the time-period of permitted browsing (e.g., August 2013) cannot be browsed because the time key $S_8$ cannot be generated.

Incidentally, although the time key T and the time key S are caused to correspond to months in the above-described example, they may also be managed in a manner of being caused to correspond to whatever arranged in time sequence such as by days or by hours.

According to the present embodiment explained so far, because the time keys allow an arbitrary user to specify to an agent a time-period during which browsing of information directed to the user is permitted in his/her behalf, the agent for the user is capable of browsing the information directed to the user only during a certain time-period specified by the user, while suppressing the number of the keys to be managed.

The one embodiment of the present invention has been explained so far; the present invention is, however, not limited thereto, and various modifications are possible within the scope of not departing from its essence and spirit.

The invention claimed is:

1. A method of encrypting/decrypting information in an information service system where requested information is encrypted with an information providing server storing information in response to a request for information from any one of a plurality of user terminals and the requested information is transmitted to a user terminal of a source of information request via an information relay device, the method comprising the steps of:
receiving with the information relay device a request for information from a terminal of a second user that is an agent for a first user;
re-encrypting with the information relay device encrypted data of the information directed to a terminal of the first user using a re-encryption key for the second user, the encrypted data being stored in an encrypted-data memory unit, the re-encryption key being stored in a first encryption-key memory unit;
transmitting with the information relay device the re-encrypted data to the terminal of the second user;
receiving with the terminal of the second user the re-encrypted data from the information relay device; and
decrypting with the terminal of the second user the re-encrypted data received, using an encryption key for the second user and time keys specified by the terminal of the first user, the encryption key being stored in a second encryption-key memory unit, the time keys being related to a time-period during which browsing of the information is permitted;
wherein the re-encryption key for the second user is a prescribed calculation result from an inverse of an encryption key for the first user and the encryption key for the second user, the encryption key for the first user being generated with the terminal of the first user,
the method, further comprising the steps of:
generating with the information relay device the re-encrypted data by re-encrypting the encrypted data of the information using the encryption key for the second user without decrypting with the encryption key for the first user, the encrypted data of the information being able to be decrypted with the encryption key for the first user, the re-encrypted data being able to be decrypted using the encryption key for the second user; and
transmitting with the information relay device the re-encrypted data generated, to the terminal of the second user.

2. The method of encrypting/decrypting information according to claim 1, further comprising the steps of:
receiving with the terminal of the second user the re-encrypted data from the information relay device;
generating with the terminal of the second user a time key $T_i(p \leq i)$ from a time key $T_p$ (p is an arbitrary positive integer satisfying $1 \leq p$), related to a start point of the time-period during which browsing of the information is permitted and generated from a time key $T_1$ with the terminal of the first user using a hash function H possessing a one-way property;
generating with the terminal of the second user a time key $S_i(i \leq q)$ from a time key $S_q$ (q is an arbitrary positive integer satisfying $q \leq N$), related to an end point of the time-period during which browsing of the information is permitted and generated from a time key $S_N$ (N is an arbitrary positive integer) with the terminal of the first user using the hash function H; and
decrypting with the terminal of the second user the re-encrypted data received, using a private key which is the encryption key for the second user, the time key $T_i$, and the time key $S_i$.

3. The method of encrypting/decrypting information according to claim 2, further comprising the steps of:
generating with the terminal of the first user the time key $T_p$ from the time key $T_1$ in accordance with $T_{i+1} = H(T_i)$ using the hash function H;
generating with the terminal of the first user the time key $S_q$ from the time key $S_N$ in accordance with $S_{i-1} = H(S_i)$ using the hash function H; and
transmitting with the terminal of the first user the time key $T_p$ generated above and the time key $S_q$ generated above to the terminal of the second user.

4. A non-transitory machine readable storage medium having stored thereon a program for causing a computer to execute the method of encrypting/decrypting information according to claim 2.

5. A non-transitory machine readable storage medium having stored thereon a program for causing a computer to execute the method of encrypting/decrypting information according to claim 3.

6. A non-transitory machine readable storage medium having stored thereon a program for causing a computer to execute the method of encrypting/decrypting information according to claim 1.

7. An information service system comprising:
- an information providing server which stores information and with which requested information is encrypted in response to a request for information from any one of a plurality of user terminals and transmitted to a user terminal of a source of information request via an information relay device;
- a terminal of a first user;
- a terminal of a second user which is an agent for the first user; and
- an information relay device which receives a request for information made from the terminal of the second user, re-encrypts encrypted data of the information directed to the terminal of the first user using a re-encryption key for the second user, and transmits the re-encrypted data to the terminal of the second user, the encrypted data being stored in an encrypted-data memory unit, the re-encryption key being stored in a first encryption-key memory unit, the terminal of the second user receiving the re-encrypted data from the information relay device, and decrypting the re-encrypted data received, using an encryption key for the second user and time keys specified by the terminal of the first user, the encryption key being stored in a second encryption-key memory unit, the time keys being related to a time-period during which browsing of the information is permitted;
- wherein the re-encryption key for the second user is a prescribed calculation result from an inverse of an encryption key for the first user and the encryption key for the second user, the encryption key for the first user being generated with the terminal of the first user,
- wherein the information relay device generates the re-encrypted data by re-encrypting the encrypted data of the information using the encryption key for the second user without decrypting with the encryption key for the first user, and transmits the generated re-encrypted data to the terminal of the second user, the encrypted data of the information being able to be decrypted with the encryption key for the first user, the re-encrypted data being able to be decrypted using the encryption key for the second user.

8. The information service system according to claim 7, wherein the terminal of the second user receives the re-encrypted data from the information relay device, generates a time key $T_i(p \le i)$ from a time key $T_p$ (p is an arbitrary positive integer satisfying $1 \le p$), related to a start point of the time-period during which browsing of the information is permitted and generated from a time key $T_1$ with the terminal of the first user using a hash function H possessing a one-way property, generates a time key $S_i$ ($i \le q$) from a time key $S_q$ (q is an arbitrary positive integer satisfying $q \le N$), related to an end point of the time-period during which browsing of the information is permitted and generated from a time key $S_N$ (N is an arbitrary positive integer) with the terminal of the first user using the hash function H, and decrypts the re-encrypted data received, using a private key which is the encryption key for the second user, the time key $T_i$, and the time key $S_i$.

9. The information service system according to claim 8, wherein the terminal of the first user generates the time key $T_p$ from the time key $T_1$ in accordance with $T_{i+1}=H(T_i)$ using the hash function H, generates the time key $S_q$ from the time key $S_N$ in accordance with $S_{i-1}=H(S_i)$ using the hash function H, and transmits the time key $T_p$ generated above and the time key $S_q$ generated above to the terminal of the second user.

* * * * *